United States Patent
Aufdencamp et al.

(10) Patent No.: US 12,397,815 B2
(45) Date of Patent: Aug. 26, 2025

(54) LINEAR MOVEMENT FOR CONTROL POINT DETECTION VERIFICATION

(71) Applicant: GM Cruise Holdings LLC, San Francisco, CA (US)

(72) Inventors: Philip David Aufdencamp, San Mateo, CA (US); Glenn D. Sweeney, Sebastopol, CA (US)

(73) Assignee: GM Cruise Holdings LLC, San Francisco, CA (US)

(*) Notice: Subject to any disclaimer, the term of this patent is extended or adjusted under 35 U.S.C. 154(b) by 882 days.

(21) Appl. No.: 17/557,427

(22) Filed: Dec. 21, 2021

(65) Prior Publication Data

US 2023/0192119 A1  Jun. 22, 2023

(51) Int. Cl.
*B60W 60/00* (2020.01)
*G06V 20/56* (2022.01)

(52) U.S. Cl.
CPC ........... *B60W 60/001* (2020.02); *G06V 20/56* (2022.01); *B60W 2420/403* (2013.01); *B60W 2420/408* (2024.01)

(58) Field of Classification Search
CPC ......... B60W 60/001; B60W 2420/403; B60W 2420/408; G06V 20/56; G01S 7/4026; G01S 7/4082; G01S 7/4972; G06T 7/85
See application file for complete search history.

(56) References Cited

U.S. PATENT DOCUMENTS

| | | | |
|---|---|---|---|
| 10,742,969 B1* | 8/2020 | Rohatgi | H04N 17/002 |
| 2007/0182623 A1* | 8/2007 | Zeng | G01S 13/862 |
| | | | 342/174 |
| 2019/0145765 A1* | 5/2019 | Luo | G06V 10/764 |
| | | | 702/153 |
| 2021/0033712 A1* | 2/2021 | Yang | G01S 7/4808 |
| 2023/0066919 A1* | 3/2023 | Navin | B60W 30/02 |
| 2024/0098245 A1* | 3/2024 | Adams | H04N 17/002 |
| 2024/0159871 A1* | 5/2024 | Zhang | G01S 7/4808 |
| 2024/0362509 A1* | 10/2024 | Liu | G06N 3/08 |

* cited by examiner

*Primary Examiner* — Thomas Ingram
(74) *Attorney, Agent, or Firm* — Honigman LLP; Matthew H. Szalach; Jonathan P. O'Brien (57) ABSTRACT

A sensor calibration evaluation system evaluates the quality of control point detection by translating a control object within a scene by a measured amount to generate a sequence of sensor views of the scene as the control object is translated by a known (measured) amount. The control points within each of the sequence of sensor views are detected with a control point detection algorithm. By detecting the control points and determining the detected movement of the control points, a correlation between the measured movement and detected movement can be determined and represent the quality of the control point detection given the set of detection conditions.

20 Claims, 6 Drawing Sheets

LINEAR MOVEMENT FOR CONTROL POINT DETECTION VERIFICATION

TECHNICAL FIELD

This disclosure relates generally to verifying the precision of control point detection hardware and software and more specifically to using linear movement of a control point to evaluate control point detection precision.

BACKGROUND

Various devices may sense an environment around the device and determine movement based on the sensed environment. One example is an autonomous vehicle (AV), which is a vehicle that is capable of sensing and navigating its environment with little or no user input and thus be fully autonomous or semi-autonomous. An autonomous vehicle may sense its environment using sensing devices such as Radio Detection and Ranging (RADAR), Light Detection and Ranging (LIDAR), image sensors, cameras, and the like. An autonomous vehicle system may also use information from a global positioning system (GPS), navigation systems, vehicle-to-vehicle communication, vehicle-to-infrastructure technology, or drive-by-wire systems to navigate the vehicle.

For complex systems using a variety of sensors to detect characteristics of an environment, calibration of those sensors is essential to accurately identify objects in the environment, translate sensor-captured information to a joint coordinate system relative to other sensors, and generally acquire an accurate measure of the world around the sensors. For example, systems may include an array of different sensors, such as image sensors (e.g., light cameras), LIDAR, RADAR, and other types of sensors that capture information about the world. To construct an accurate representation of the environment captured by the sensors, such sensors may need to be calibrated with respect to their own characteristics (e.g., intrinsic calibration) and calibration with respect to the respective sensors' relation to one another, such that information captured by those sensors may be effectively merged to a reliable representation of the environment as a whole.

In many techniques used for sensor calibration, a calibration environment may be used with various objects. Various sensors to be calibrated may capture an image of the environment and be calibrated based on detected control points (e.g., specific features or shapes) of the objects in the environment. However, such calibration often assumes that the algorithms used for detecting such control points (and the positions thereof) is relatively accurate for the control objects and the conditions in the environment under which they are captured. When such control point detection algorithms are inaccurate or imprecise, it may increase errors in the overall calibration of the sensors and yield an inaccurate representation of the environment when the sensors are used after calibration. Identifying such inaccuracies in control point detection may be difficult as there may be few ways of determining whether the control points are accurately detected apart from the algorithms that use the detected control points for sensor calibration.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION

Overview

To detect such inaccuracies and improve control point detection, a sensor calibration evaluation system evaluates the accuracy and precision of a control point detection algorithm for a sensor detecting a control point on a control object in a calibration scene. The calibration scene is an environment captured by the sensors for performing the calibration. The evaluated accuracy may be used to verify that the control point detection algorithm is effective for a given control object, sensor capture characteristics, and characteristics of the calibration scene. Together (including the particular control point detection algorithm), these form a set of "detection conditions" that may affect the accuracy and precision of control point detection. A given combination of detection conditions may be compared with another combination to determine the relative accuracy of different detection conditions. By comparing a variety of objects, scene characteristics, sensor capture characteristics, etc., a range of operable detection conditions for these various inputs can be determined for which a given control point detection process performs well. The comparison of different control point detection algorithms and detection conditions may also be used to select a combination of detection conditions to be used in one or more different scenes for calibration of the sensors. For example, the comparison of control point detection algorithms and relative conditions may reveal that a first control point detection algorithm has a high accuracy score in low-light conditions for a first type of control object but not for high-light conditions or for other control objects, while a second control point detection algorithm has a high accuracy score in high-light conditions for a second type of control object. Depending on the lighting of a particular calibration scene, the control object and control point detection algorithm may thus be selected according to the demonstrated scoring in the respective conditions. The verification and scoring of control point detection algorithm discussed herein has many applications, some of which are discussed below.

To evaluate the control point detection algorithm with respect to a set of detection conditions, the control points to be detected on a control object are linearly moved by a known, measured amount and compared to the detected locations reported by the algorithm. To evaluate the accuracy of the algorithm, the linear correlation between the known movement of the control points is determined with respect to the movement of the detected control point positions. The higher the correlation between the two, the more accuracy (e.g., sensitivity to change) the control point detection algorithm has with respect to consistent detection across different locations of the control object within the scene.

To perform the evaluation, a physical distance between a control object and the sensor is modified with a linear translation mechanism attached to the sensor or the control object (on which a control point is located). The sensor captures a sensor view of the calibration scene including the control object. The sensor view is the captured data about the environment by the sensor and may vary depending on the particular sensor (e.g., a camera may capture a two-dimensional image, a LIDAR sensor may capture a point cloud, etc.). The physical position between the control object and the camera is modified by moving the control object or the camera along the linear translation mechanism and another sensor view is captured of the calibration scene of the control object at the modified position. The changed position of the control object or the camera is measured with respect to the traveled distance along the linear translation mechanism when the associated sensor view is captured. The movement along the linear translation mechanism of the object or sensor, sensor view capture, and measurement is repeated to generate a sequence of sensor views and associated measured positions of the moved relationship between the control object and the sensor. In each sensor view, the control point detection algorithm is used to identify a detected control point and its respective location in the sensor view. detect the position of a To evaluate the detection conditions, a linear correlation is determined between the moved physical positions and associated locations of detected control points in the sequence of sensor views, such that a higher correlation represents a higher quality score for the control point detection.

As will be appreciated by one skilled in the art, aspects of the present disclosure, may be embodied in various manners (e.g., as a method, a system, a computer program product, or a computer-readable storage medium). Accordingly, aspects of the present disclosure may be implemented in hardware, software, or a combination of the two. Thus, processes may be performed with instructions executed on a processor, or various forms of firmware, software, specialized circuitry, and so forth. Such processing functions having these various implementations may generally be referred to herein as a "module." Functions described in this disclosure may be implemented as an algorithm executed by one or more hardware processing units, e.g., one or more microprocessors of one or more computers. In various embodiments, different steps and portions of the steps of each of the methods described herein may be performed by different processing units and in a different order unless such an order is otherwise indicated, inherent or required by the process. Furthermore, aspects of the present disclosure may take the form of one or more computer-readable medium(s), e.g., non-transitory data storage devices or media, having computer-readable program code configured for use by one or more processors or processing elements to perform related processes. Such a computer-readable medium(s) may be included in a computer program product. In various embodiments, such a computer program may, for example, be sent to and received by devices and systems for storage or execution.

This disclosure presents various specific examples. However, various additional configurations will be apparent from the broader principles discussed herein. Accordingly, support for any claims which issue on this application is provided by particular examples as well as such general principles as will be understood by one having ordinary skill in the art.

In the following description, reference is made to the drawings where like reference numerals can indicate identical or functionally similar elements. Elements illustrated in the drawings are not necessarily drawn to scale. Moreover, certain embodiments can include more elements than illustrated in a drawing or a subset of the elements illustrated in a drawing. Further, some embodiments can incorporate any suitable combination of features from two or more drawings.

As described herein, one aspect of the present technology may be the gathering and use of data available from various sources to improve quality and experience. The present disclosure contemplates that in some instances, this gathered data may include personal information. The present disclosure contemplates that the entities involved with such personal information respect and value privacy policies and practices.

The following disclosure describes various illustrative embodiments and examples for implementing the features and functionality of the present disclosure. While particular components, arrangements, or features are described below in connection with various examples, these are merely examples used to simplify the present disclosure and are not intended to be limiting.

Reference may be made to the spatial relationships between various components and to the spatial orientation of various aspects of components as depicted in the attached drawings. However, the devices, components, members, apparatuses, etc. described herein may be positioned in any desired orientation. Thus, the use of terms such as "above," "below," "upper," "lower," "top," "bottom," or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, or conditions, the phrase "between X and Y" represents a range that includes X and Y.

In addition, the terms "comprise," "comprising," "include," "including," "have," "having," or any other variation thereof, are intended to cover a non-exclusive inclusion. For example, a method, process, device, or system that comprises a list of elements is not necessarily limited to only those elements but may include other elements not expressly listed or inherent to such method, process, device, or system. Also, the term "or" refers to an inclusive or and not to an exclusive or.

Sensor Calibration Overview

Figure 1:
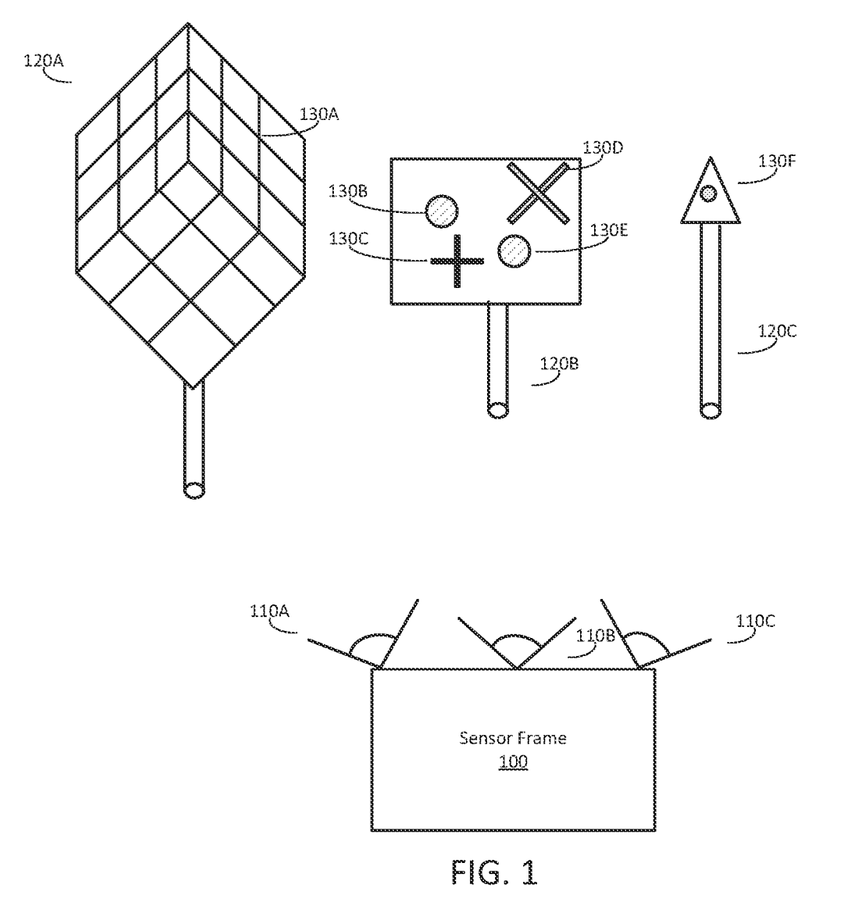
FIG. 1 shows an example calibration scene including example control objects and a sensor frame having sensors, according to one embodiment.

FIG. 1 shows an example calibration scene including example control objects 120 and a sensor frame 100 having sensors 110. The sensor frame 100 includes one or more sensors 110 for detecting characteristics of the environment around the sensor frame 100. The sensors may be disposed on the sensor frame 100 to capture different views of the environment and may include different types of sensors. In general, the examples discussed below relate to image sensors, such as a camera, that capture visible light and generates a two-dimensional image made up of individual pixels. Additional types of sensors may also be used with the techniques discussed herein, such as non-visible light sensors (e.g., infrared or ultraviolet imaging), RADAR, LIDAR, and other devices that sense an environment and may be evaluated with respect to detection of portions of objects in an environment. Hence, while imaging sensors are used as a general example, these and other types of sensors may also be used.

The sensor frame 100 is a structure on which the sensors 110 are affixed. The sensor frame 100 may include several such sensors 110, such as the three sensors 110A-110C as shown in FIG. 1. The sensors 110 may be the same type of sensor, for example several different imaging sensors to view different portions of the environment around the sensor frame 100 from various perspectives, or may include different types of sensors, such as a combination of an imaging sensor, a LIDAR sensor, and a RADAR sensor. Various embodiments may include any number and type of sensors 110 according to the particular use of the device, and configurations may also use a single sensor 110. The sensor frame 100 represents the physical structure on which the sensors 110 are disposed, and in various embodiments may have different forms. As one example, the sensor frame 100 may be capable of movement, such as a vehicle, drone, or other system for navigating an environment. The sensors 110 in these configurations may be used (along with related imaging and perception algorithms) to perceive objects and other conditions of the environment and the position of the sensor frame 100 with respect to the environment. In other configurations, the sensor frame 100 may be used to capture aspects of the environment for other purposes, such as generating a three-dimensional representation of the environment (e.g., for generating three-dimensional video content or mapping of an environment). In each of these cases, calibration of the sensors 110 may be essential to correctly perceiving the environment and any further analysis of the captured sensor data. For example, in robotics or automated vehicle use, improperly calibrated sensors may cause the system to misperceive the relative location of objects or environmental features and increasing the difficulty of successfully navigating the environment.

Such calibration may include intrinsic parameters (e.g., parameters describing calibration of a sensor with respect to its own characteristics), and extrinsic parameters (e.g., parameters describing the position and orientation of a sensors 110 with respect to one another or with the sensor frame 100). Thus, as one example, calibration of intrinsic parameters may determine parameters to correct distortion, warping, or other imperfections of a camera lens. As an example of extrinsic calibration, while the sensors may generally be affixed to the sensor frame 100 according to specific design characteristics (e.g., designating a location for sensor 110A and its orientation in the frame), manufacturing and assembly tolerances may still yield deviation from nominal position that is significant relative to the sensing capabilities of the sensor 110, such that precisely determining the pose of each sensor 110 relative to one another and the sensor frame 100 improves joint analysis and processing of the individual data from each sensor 110 and successfully generating an accurate model of the environment.

The calibration scene shown in FIG. 1 includes various types of control objects 120. In this example, the control objects include one or more control points 130 that are identified by analysis of sensor data capture during calibration and used to calibrate the sensors 110. Generally, each control point is a distinguishable feature of the control object that is intended to be readily and reliably detected by analysis of the sensor data. As one example, control object 120A is an open-faced cube showing three planes, each having a set of straight lines. Analysis of the sensor data capturing the control object 120A may be used to identify a control point 130A (among others on the control object 120A) at the intersections of the lines, or in other cases to identify the individual lines themselves. As one example of calibrating intrinsic parameters, a camera's captured image of the control object 120 may be analyzed to determine a set of parameters for correcting any warping or distortion of the control object 120A in the collected image. Because the lines of control object 120A are known to be straight, any bending or curve of the detected control points 130A in the captured image may be corrected with appropriate parameters, such that in the corrected image, the known-straight lines of the control object 120A are straight after application of the intrinsic parameters to the captured image. However, incorrectly perceiving the features of the control object 120A may cause the calibration to determine calibration parameters that correct distortion with respect to the incorrectly perceived features.

Another example control object 120B includes several control points 130B-130E. This control object 120B may be used to assist in calibrating the position of the multiple sensors with respect to one another. For example, to determine the position and orientation of each sensor with respect to one another based on the detected size, shape, position, orientation, etc., of the detected control points 130B-E on control object 120B. As a final example, control object 120B includes a trihedral control point 130F. Such a trihedral may be used, e.g., for calibration of RADAR sensors and may be more readily identified by a RADAR sensor. Thus, the various types of control objects 120 and the control points 130 are generally designed to be readily detectable by one or more respective sensors 110 to assist in calibration of the sensor 110. Imprecision or unreliability of detecting the control points in each case may thus cause the parameters determined during calibration to be based on these inaccurately detected points.

Figure 2:
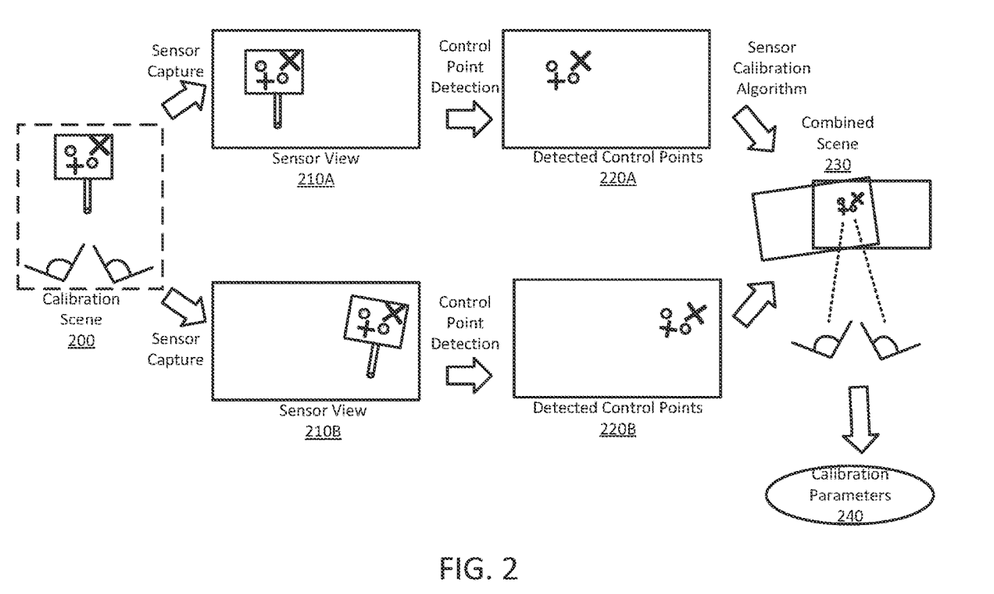
FIG. 2 shows an example calibration flow for two sensors with a calibration scene, according to one embodiment.

FIG. 2 shows an example calibration flow for two sensors with a calibration scene 200, according to one embodiment. In this example, the calibration scene 200 includes a control object similar to the control object 120B shown in FIG. 1. In various different configurations, the calibration scene 200 may include many different control objects as shown and discussed above. As shown in this example, each sensor captures respective sensor views 210A and 210B. As each sensor captures the control object from different locations, the control object appears in the captured sensor view 210 at different locations. Using a control point detection algorithm, the sensor view 210 is analyzed to identify one or more detected control points 220A-B in the respective sensor view. Each detected control point may be characterized in various ways in different configurations depending on the control point and the control point detection algorithm. For example, one approach may detect a specific location on a control point (e.g., where the control point is a small circle), while in another approach, the control point detection algorithm identifies an outline of a control point using an edge detection algorithm and may determine an approximate center of the control point based on the detected outline. Though represented in different ways, each detected control point may be represented at a given position in the respective detected control points 220A-B. In the example of an image sensor, the detected control point may be a particular pixel coordinate in the captured image of the calibration scene. In other examples, such as a captured LIDAR point cloud, the location of the detected control point may be a three-dimensional position relative to the origin of the sensor.

In this example, the detected control points 220A-B are used to determine calibration parameters 240 that describe the position and orientation of the control points such that the detected control points 220A-B from each sensor view 210A-B are aligned in a combined scene 230. Because the detected control points are estimates from the sensor view, the aligned points in the combined scene 230 may be an optimization or estimation of the sensor position and rotation that minimizes the discrepancy between the location at which the same point is identified in each sensor view 210A-B. Errors in the detected location of the control points, therefore, may affect the calibration parameters 240.

The detection of the control points, however, may be a function of several factors, collectively termed "detection conditions" (i.e., the conditions under which the control points are detected). Such detection conditions include the detection algorithm used to evaluate the captured sensor view, as well as sensor capture characteristics, control object characteristics, and scene characteristics. Each of these is discussed in turn:

Control Point Detection Algorithm.

The control point detection algorithm may be based on the particular type of sensor as well as the type of control points being detected and the control object on which the control points are disposed. As also discussed above, such control point detection algorithms may include edge detection, object segmentation, detection of round or curved edges, identification of characteristic points, colors, or other signifying features of the control points, and so forth. In addition, various algorithms may be used to analyze or summarize a detected edge or outline of a detected control point to determine a position or location for the control point (e.g., a center of mass) to represent the position of the control point as a whole). Thus, many different types of detection algorithms may be used, including for the same types of control points and control objects. Certain detection algorithms may be more effective in certain types of scenes, such as well-lit or poorly-lit environments, or areas with significant ambient light, or may more effectively detect different types of control objects.

Sensor Capture Characteristics.

The sensor capture characteristics refer to characteristics and settings of the sensor when it captured the calibration scene to generate a sensor view. The particular types of sensor capture characteristics that may be used vary depending on the type of sensor. For example, for an imaging sensor (e.g., a camera), the sensor capture characteristics may include the particular brand/model of the imaging sensor, a focal length, exposure time, shutter speed, aperture, shooting mode, captured image size and resolution, color space, and so forth. Similar sensor capture characteristics may be used for other types of sensors according to the possible capture settings of the particular sensor.

Control Object Characteristics.

The control object characteristics refer to aspects of the control object and the control point(s) to be detected on the control object. Such characteristics may vary depending on the type of calibration and/or the type of sensor. The control object may take various forms, shapes, sizes, colors, etc., as may the control points to be detected by the control point detection algorithm. As shown in FIG. 1, the control points may include various shapes, such as circles, squares, diamonds, crosses, and in various embodiments may be two or three-dimensional shapes. The control object may also include various control points to be detected in various patterns, such as stripes, crosshatch, or other designs generally designed to be readily detected and distinguished by the control point detection algorithm. The control object may include different colors, such as contrasting colors, to assist in ready detection of the points. The control objects may also vary in shape and size according to the particular sensor being used, for example using image patterns or recognizable shapes for an image sensor, a reflective surface in a suitable shape (e.g., a sphere) for LIDAR, or a trihedral or corner reflector for RADAR detection. These and other characteristics of the control object may affect the detection of the control points on the object.

Scene Characteristics.

The scene characteristics refer to the various characteristics of the calibration scene apart from the control object itself. For example, the amount and type of lighting is one scene characteristic, which may include color tone, lighting source/type, brightness, diffuse or spot lighting and so forth. Similarly, scene characteristics may also include environmental conditions that may also affect the performance of the sensors in capturing the control objects. Such environmental conditions may include humidity, fog, air clarity/pollution, and so forth. In some examples, the calibration scene 200 may be in a relatively controlled environment, such as a closed warehouse, while in others the calibration scene 200 may be established in a relatively less-controlled environment, such as in a temporary calibration environment established outside. Such calibration environments may be used, for example, to perform re-calibration of sensors after the sensors have been in operation or after replacement of one or more sensors on an operating system. For example, in an autonomous vehicle or other robotic device which suffers damage may require a replacement part or sensor and require recalibration to verify performance of the device and its perception systems. Effectively validating the performance of control point detection (and thus confidence in resulting calibration) may ensure that such calibration under less-controlled environments may nonetheless be effective and reliable.

Thus, for effective control point detection, the particular control object with its control points in the conditions of the particular scene, given the characteristics with which the sensor captured a sensor view, and the particular algorithm used to detect the control points within the sensor view, must successfully operate together as a set of detection conditions. Any of these detection conditions working ineffectively with another may yield inconsistent or unreliable control point detection.

Control Point Detection with Linear Translation

Figure 3A:
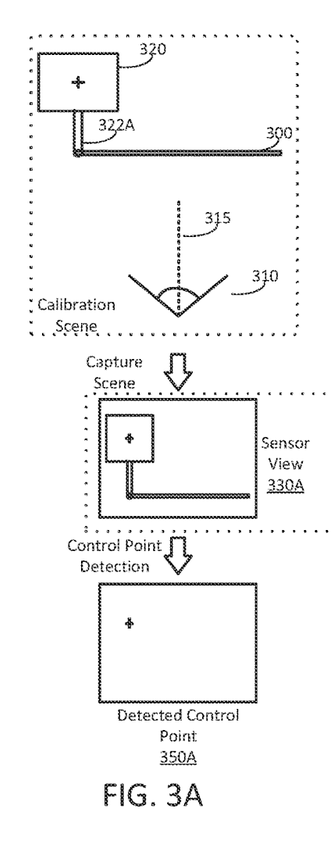
FIGS. 3A-3C shows an example calibration scene for verifying detection conditions using a sequence of captured sensor views.
Figure 3B:
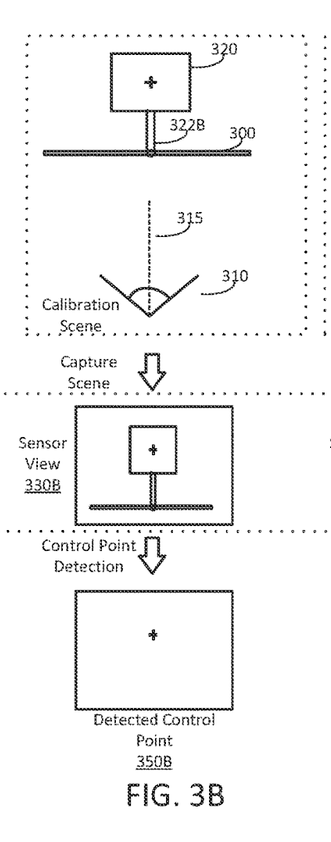
Figure 3C:
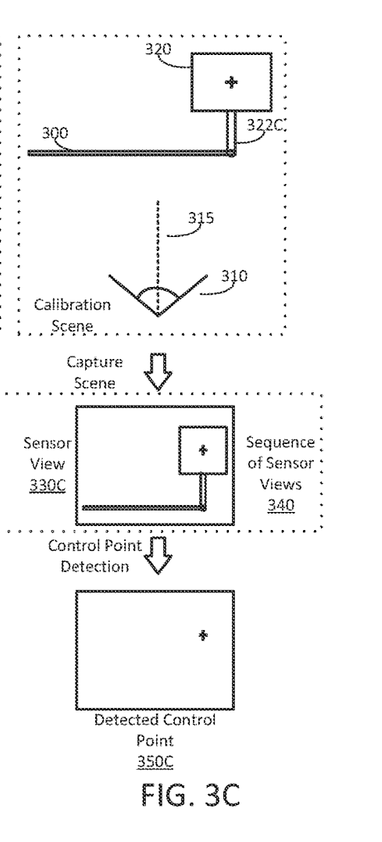

FIGS. 3A-3C shows an example calibration scene for verifying detection conditions using a sequence of captured sensor views. FIGS. 3A-3C show the respective movement of a control object 320 along a linear translation mechanism 300 to positions 322A-C as sensor views 330A-C are captured that together yield a sequence of sensor views 340. For convenience, a single control point is shown in FIGS. 3A-3C for control object 320; in other examples more control points may be disposed and detected on the control object 320, and additional control objects 320 may also be used.

In the examples shown in FIGS. 3A-3C and FIG. 4 relate to the movement of a control object 320 positions 322A-C via a linear translation mechanism 300 to. In alternate embodiments, linear movement with respect to a sensor 310 and the control object 320 may be performed by moving the sensor 310 rather than the control object 320. For example, the sensor 310 may be attached to a linear translation mechanism 300 and moved to affect the relative physical positioning of the sensor and the control object 320 in the calibration scene. As such, while the discussion herein typically discusses circumstances in which the control object 320 is moved, the same principles apply to moving the sensor 310 within the calibration scene.

In the initial calibration scene shown in FIG. 3A, the calibration scene includes a sensor 310 and a linear translation mechanism 300 having a control object 320 at an initial position 320A. The sensor 310 captures a sensor view 330A of the scene in which a control point detection algorithm identifies a position of a detected control point 350A. The linear translation mechanism 300 is a device which is configured to linearly move the control object by relatively small, precise amounts. To determine the relative quality of a set of detection conditions, the control object 320 is moved in the calibration scene and the sensor captures a view of the object at the moved position. In this example, the control object 320 is moved from position 322A to position 322B and then position 322C through FIGS. 3A-3C. The movement of the control object 320 is measured such that the movement of the control object 320 relative to the location of detected control points 350A-C may be compared. In various embodiments, the control object and linear translation mechanism 300 may be near or within a sensor axis 315. The sensor axis 315 may be the central axis of view from the sensor 310 within the calibration scene or towards the control object 320. In one embodiment, the linear translation mechanism 300 moves the control object 320 generally perpendicular (e.g., orthogonally) relative to the sensor axis 315. For example, the linear translation mechanism may move the object along a linear path that is within a range of 0, 5, 10, 15, 30, or 45 degrees to the perpendicular of the sensor axis 315.

The linear translation mechanism 300 may include a track or other linear path along which the control object 320 is moved. In various embodiments, the linear translation mechanism may also be capable of measuring the amount of movement of the control object 320. Depending on the sensitivity of the linear translation mechanism 300, the mechanism may be capable of moving the control object by millimeters or micrometers and measuring the resulting movement. The particular movement amount and measurement sensitivity of the linear translation mechanism 300 may also be a function of the particular sensor being used. In general, more-sensitive and higher-resolution sensors may require smaller error in measured movements by the linear translation mechanism 300, while for less-sensitive sensors, larger errors in measured movement may still be effective for evaluating control point detection. In other examples, the control object may be moved by a linear translation mechanism 300 and the movement may be measured by another device. The movement of the linear translation mechanism 300 may also be orchestrated by a calibration evaluation system that instructs the linear translation mechanism 300 to move the control object and also instructs the sensor to capture the scene and generate a sensor view 330.

FIGS. 3A to 3C show the respective positions 322A-C, captured sensor views 330A-C. and detected control points 350A-C as the control object 320 is moved and a sequence of sensor views 340 is captured. While the quality of the control point detection may be evaluated with linear movements of a variety of amounts, in some embodiments the amount of movement may be relatively small and based on characteristics of the sensor 310. As such, in various embodiments, the amount that the control object 320 is moved may be based on the sensitivity and expected precision of the sensor and the distance of the control object 320 from the sensor. For example, in an imaging sensor, the field of view and resolution of the captured image may describe the density of captured pixels within the image. E.g., the number of pixels per degree of view. Based on the number of pixels per degree and the distance of the control object 320, an amount of movement may be determined for the linear translation mechanism 300 to evaluate pixel-level precision of the control point detection. Thus, while shown in FIGS. 3A-3C as a relatively large movement of the control object across the field of view of the sensor 310, the movement may be relatively small and based on the precision of the sensor.

In various embodiments, the movement may be selected such that the movement is expected to move the control object by a portion of the sensor's resolution between captured sensor views 330. For example, the control object 320 may be moved a distance expected to move the control point within the sensor view 330 by 10 or fewer pixels (for an imaging sensor). The expected movement may thus be a function of the distance of the control object 320 from the sensor 310 and the density of pixels per degree of viewing angle. In some embodiments, the movement is intended to move less than a measurable resolution of the sensor. For example, for a resolution defined by a pixel size, the translated movement may be specified to correspond to an expected 0.1, 0.25, 0.5, 0.75 of a pixel size for the sensor. As such, the movement of the control object 320 may be a function of the expected sensitivity of the sensor 310. In this example, by moving the control object by an amount at the expected sensitivity of the sensor, the control point detection algorithm may be evaluated with respect to small movements at the sensitivity limits of the sensor. As also noted above, in other embodiments, other approaches may be used to create and measure relative movement between the control object and the sensor, for example by moving the sensor 310 rather than the control object 320 with the linear translation mechanism 300.

The amount that the control object 320 is moved may also vary across the captured views. While three examples are shown in FIG. 3A-3C, in practice the control object may be moved dozens or hundreds of times to capture a corresponding sequence of sensor views 340. The amount of movement may change across the sequence of sensor views 340, for example to initially move the control object 320 a distance expected to correspond to an amount smaller than the sensitivity of the sensor 310 (e.g., less than a pixel for an imaging sensor), and later in the sequence move the control object by larger amounts (e.g., for an imaging sensor, ten or more pixels).

Figure 4:
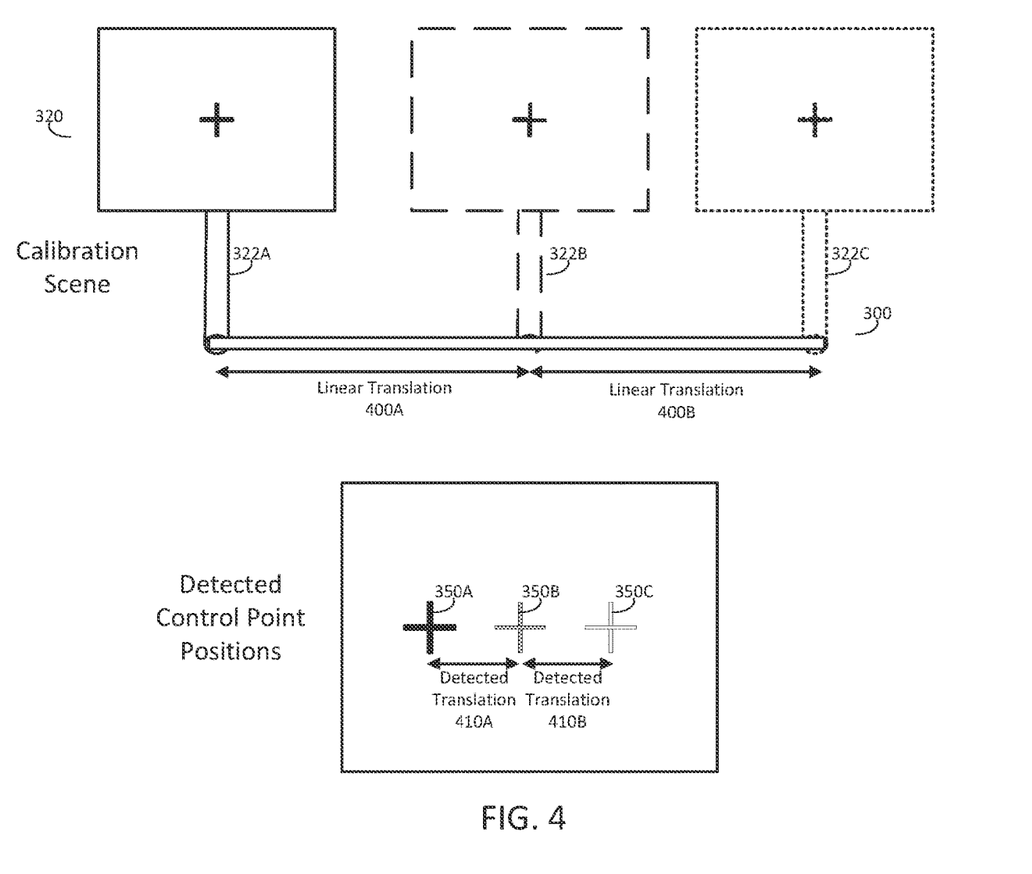
FIG. 4 shows an example translation of a control object relative to translation of detected control point positions, according to one embodiment.

FIG. 4 shows an example linear translation 400 of a control object 320 relative to detected translation 410 of control points, according to one embodiment. FIG. 4 continues the example of FIG. 3A-3C, illustrating the relative positions 322A-C of a control object 320 as moved within a scene by the linear translation mechanism 300 to a first position 322A, a second position, and a third position 322C. Using the measured movements, the linear translation 400 between known positions of the control object 320A-C may be determined. A first linear translation 400A describes the movement between a first position 322A and a second position 322B, and a second linear translation 400B describes the movement between the second position 322B and the third position 322C of the control object 320C. Likewise, the detected control points 350A-C of the control points within the sensor views 330A-C are measured relative to a detected translation 410. Although detected in separate scene views 330A-C, FIG. 4 illustrates respective positions of the detected control points 350 A-C. The position of the detected control point 350A is compared with a position of the control point 350B to determine a detected translation 410A, and the position of the detected control point 350B is compared with the position of the detected control point 350C to determine a detected translation 410B. Though the example of FIG. 4 shows three example positions 322A-C of the control object 320 and three respective detected control points 330A-C, as discussed above the number of positions 322, captured sensor views 330, and detected control points 350 may vary and may include many more sensor views in a sequence.

Figure 5:
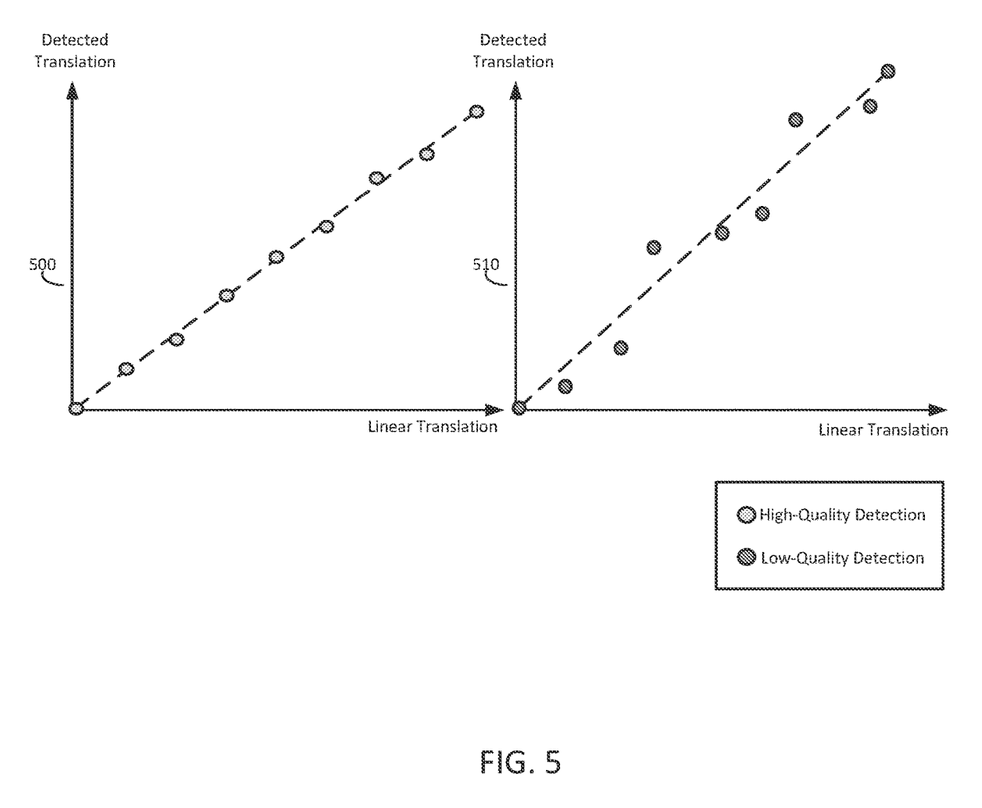
FIG. 5 shows an example of evaluating the quality of control point detection according to one embodiment.

FIG. 5 shows an example of evaluating the quality of control point detection according to one embodiment. Based on the measured (known) translation of the control object for the sequence of sensor views and the detected translation of the control objects, the quality of the control object detection may be evaluated using the linear correlation of the linear translation of the control object with respect to the detected translation of the control object. In a well-functioning set of detection conditions, the two translations (e.g., the measured physical translation of the control object and the detected translation) should be highly correlated. While the precise amounts may vary according to the specific test setup, the movement of the control object linearly along a path by known amounts should yield a similar amount of movement of the detected positions of the control object. That is, when the control object moves 5 mm and the detected control point position moves 5 pixels, a similar ratio of physical movement and detected control point should continue as the control object is moved, such that a further movement of 10 mm is expected to yield 10 pixels of detected control point movement within the sensor view. When the translation is not well correlated, or the amount of physical movement yields varying amounts of detected movement, there may be additional noise and imprecision in the combination of detection conditions. Hence, a first graph 500 shows a well-correlated relationship between the linear translation and the detected translation, representing a high-quality detection of the control point. Likewise, a second graph 510 shows an example of lower-quality detection, in which there is significant noise among the correlation. This may represent a poorer detection algorithm, a more difficult control object for detection, challenging environmental conditions, etc. relative to the first graph 500.

In one embodiment, the correlation may be measured based on a linear regression of the measured translation and the detected translation (or as an alternative, of the measured positions of the control point and the position of the detected control points). In an embodiment using the linear regression, the correlation may be measured using an R squared ($R^2$) value, measuring the variation of the detected control points. In additional embodiments, the uncertainty (e.g., the possible error) of the measured movement of the control object may also be accounted for in assessing the correlation. As discussed further below, in addition to the correlation for a particular set of detection conditions verifying that the combination of detection conditions performs well, the comparison of different sets of detection conditions, may be used to select a particular set of detection conditions to use for calibration or to determine an effective "range" of detection conditions.

Figure 6:
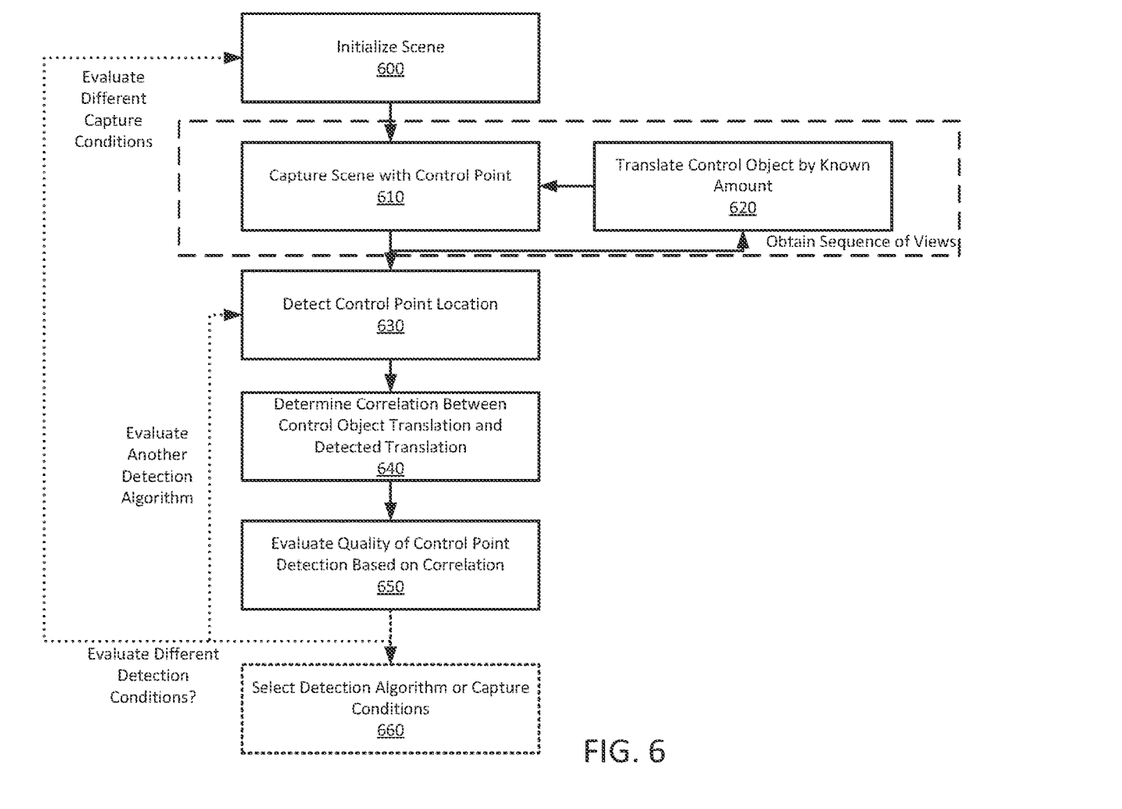
FIG. 6 shows an example flowchart for a method of evaluating the quality of control point detection, according to one embodiment.

FIG. 6 shows an example flowchart for a method of evaluating the quality of control point detection, according to one embodiment. The example method may be performed, for example, by a calibration evaluation system for evaluating control points and using such control points in the calibration of one or more sensors. The calibration evaluation system may be included in a sensor frame 100 as shown in FIG. 1 or may be an external system to the sensor frame 100 for managing the calibration process of the sensors disposed on the sensor frame 100. In general, the calibration evaluation system may be a computing or processing system for performing or evaluating calibration of various sensors. The calibration evaluation system may thus include a processor, memory, and other computing elements and may perform steps of the discussed method as well as store instructions for the method on a non-transitory computer-readable medium that are executed by one or more processors. In addition, while generally discussed with respect to one control point and one sensor, the method may be used to evaluate multiple sensors and for multiple control points (e.g., disposed on a single control object or multiple control objects) simultaneously.

To evaluate control point detection (e.g., a set of detection conditions), the scene may be initialized 600 with a control object having one or more control points for capture by the sensor and detection by a detection algorithm. The particular control object and its characteristics, along with the capture conditions of the sensor and environmental conditions may be recorded to characterize the detection conditions of the control point. The control object may be attached to a linear translation mechanism as discussed in FIG. 3, and an initial position of the control object may be determined, from which further translation and movement for the control object are measured. In other embodiments, the relative linear movement may be created by another means, such as by attaching the sensor to a linear translation mechanism.

Next, a sequence of sensor views is obtained by iteratively capturing 610 the scene with the sensor to generate a sensor view for the current scene, after which the control object (or sensor) is translated 620 by a known amount (e.g., by measuring the movement) for the next scene to be captured. A sequence of such sensor views may be generated as discussed above by translating the control object (or sensor) by amounts, which may include dozens or hundreds of sensor views. After the sequence of sensor views is obtained, the control point detection algorithm is applied to detect 630 control points in each of the sensor views. Based on the sequence of sensor views and the associated detected control point locations, the system determines 640 a linear correlation between the measured control point translation (i.e., the relative movement of the control point relative to the sensor) and detected control point translation is evaluated 650 to determine a quality (e.g., a quality score) for the control point detection.

The evaluation of the control point detection quality may be used in several ways. As a first example, the quality score may be used to validate a set of detection conditions. The quality score may be compared to a threshold to determine whether the quality score is adequate for performing calibration using the set of detection conditions. The threshold may be a fixed value, such as a correlation higher than 90, 95, or 98%, or a sufficiently low variation of points relative to a linear regression (e.g., a high $R^2$ value). In some embodiments, rather than a fixed value, the threshold may be based on the correlation and quality scores for historical measurements of different detection conditions. As such, a high quality score may be used to verify that the detection conditions for the detected control point are relatively reliable with respect to movement of the control object and that the detection conditions (e.g., the detection algorithm, detection object, etc.) may be used in the calibration.

In additional embodiments, additional quality scores may be developed for various detection conditions. As one example, a different control point detection algorithm may be used to evaluate whether the different control point detection algorithm provides more robust detection relative to a first detection algorithm given the other detection conditions (e.g., the same scene, movement, sensor characteristics, etc.). This may be repeated for several detection algorithms such that the quality scores for the respective algorithms may be determined and the highest-scoring detection algorithm for the scene may be selected as the algorithm to use for calibration including the control object, sensor characteristics, etc. As such, when calibration may use different objects and various scenes, different detection algorithms may be selected for each based on the quality scores of the detection algorithms.

As just alluded to, in addition to evaluating different detection algorithms, different capture conditions may also be evaluated by performing the process again by initializing 600 a different scene, for example with different control objects, scene characteristics, etc. and again evaluating the quality of control point detection using that scene. This may allow the evaluation of a variety of detection conditions (e.g., the various combinations of the different components of effective detection). For example, this may enable the determination of an effective "range" of conditions for a particular control object with a particular control point detection algorithm. For example, the control object may be placed a distance away from the sensor (e.g., 5 meters) and in another scene placed another distance away (e.g., 10 meters), such that the difference in control point detection quality as a function of the distance of the control object in the scene from the sensor may be determined. As another example, the same control object and control point detection algorithm may be used in various environmental conditions to verify weather conditions in which the calibration with the control object may be performed, such as with moderate or heavy fog. By evaluating the "range" of different detection conditions, the calibration scene may be optimized to select the detection algorithm or other detection conditions to be used.

ADDITIONAL EXAMPLES

Additional examples of the disclosed subject matter include:

Example 1 provides for a method including: capturing an initial sensor view of a scene with a sensor, the scene including a control object having a control point at an initial position; obtaining a sequence of sensor views and a sequence of relative control object positions, the sequence of sensor views beginning with the initial sensor view and the sequence of relative control object positions beginning with the initial position, the sequence obtained by iteratively: capturing an additional view by the sensor of a modified scene in which the control object or the sensor is translated along a linear path within the scene; and receiving a measured position of the translated control object along the linear path relative to the initial position; determining a sequence of control point locations with a control point detection algorithm applied to the sequence of sensor views; and determining a quality score for the control point detection algorithm based on a linear correlation of the sequence of control object positions with respect to the sequence of control point locations.

Example 2 provides for the method of example 1, further including: determining another quality score for another set of detection conditions; and selecting a set of detection conditions for calibration of the sensor based on the quality score and the other quality score.

Example 3 provides for the method of example 1 or 2, wherein the other set of detection conditions comprises one or more of: a different control point detection algorithm, different sensor capture characteristics, a different control object, or different scene characteristics.

Example 4 provides for the method of any of examples 1-3, further including determining an effective range of scene characteristics, control object characteristics, or sensor capture characteristics based on the determined quality score.

Example 5 provides for the method of any of examples 1-4, wherein the control object or the sensor is translated a movement amount based on a sensitivity of the sensor or the distance of the sensor from the control object within the scene.

Example 6 provides for the method of any of examples 1-5, wherein the linear path is substantially perpendicular to a sensor axis of view to the control object within the scene.

Example 7 provides for the method of any of examples 1-6, wherein the sensor is an image sensor, a LIDAR, or a RADAR.

Example 8 provides for a system including: processor; and a non-transitory computer-readable storage medium containing computer program code for execution by the processor for: capturing an initial sensor view of a scene with a sensor, the scene including a control object having a control point at an initial position; obtaining a sequence of sensor views and a sequence of relative control object positions, the sequence of sensor views beginning with the initial sensor view and the sequence of relative control object positions beginning with the initial position, the sequence obtained by iteratively: capturing an additional view by the sensor of a modified scene in which the control object or the sensor is translated along a linear path within the scene; and receiving a measured position of the translated control object along the linear path relative to the initial position; determining a sequence of control point locations with a control point detection algorithm applied to the sequence of sensor views; and determining a quality score for the control point detection algorithm based on a linear correlation of the sequence of control object positions with respect to the sequence of control point locations.

Example 9 provides for the system of example 8 in which the instructions are further for determining another quality score determined for another set of detection conditions; and selecting a set of detection conditions for calibration of the sensor based on the quality score and the other quality score.

Example 10 provides for the system of example 8 or 9, wherein the other set of detection conditions comprises one or more of: a different control point detection algorithm, different sensor capture characteristics, a different control object, or different scene characteristics.

Example 11 provides for the system of any of examples 8-10, the instructions further being for determining an effective range of scene characteristics, control object characteristics, or sensor capture characteristics based on the determined quality score.

Example 12 provides for the system of any of examples 8-11, wherein the control object or the sensor is translated a movement amount based on a sensitivity of the sensor or the distance of the sensor from the control object within the scene.

Example 13 provides for the system of any of examples 8-12, wherein the linear path is substantially perpendicular to a sensor axis of view to the control object within the scene.

Example 14 the system of any of examples 8-13, wherein the sensor is an image sensor, a LIDAR, or a RADAR.

Example 15 provides for a non-transitory computer-readable storage medium containing instructions executable by a processor for: capturing an initial sensor view of a scene with a sensor, the scene including a control object having a control point at an initial position; obtaining a sequence of sensor views and a sequence of relative control object positions, the sequence of sensor views beginning with the initial sensor view and the sequence of relative control object positions beginning with the initial position, the sequence obtained by iteratively: capturing an additional view by the sensor of a modified scene in which the control object or the sensor is translated along a linear path within the scene; and receiving a measured position of the translated control object along the linear path relative to the initial position; determining a sequence of control point locations with a control point detection algorithm applied to the sequence of sensor views; and determining a quality score for the control point detection algorithm based on a linear correlation of the sequence of control object positions with respect to the sequence of control point locations.

Example 16 provides for the non-transitory computer-readable storage medium of example 15, wherein the instructions are further for determining another quality score determined for another set of detection conditions; and selecting a set of detection conditions for calibration of the sensor based on the quality score and the other quality score.

Example 17 provides for the non-transitory computer-readable storage medium of example 15 or 16, wherein the other set of detection conditions comprises one or more of: a different control point detection algorithm, different sensor capture characteristics, a different control object, or different scene characteristics.

Example 18 provides for the non-transitory computer-readable storage medium of any of examples 15-17, the instructions further being for determining an effective range of scene characteristics, control object characteristics, or sensor capture characteristics based on the determined quality score.

Example 19 provides for the non-transitory computer-readable storage medium of any of examples 15-18, wherein the control object or sensor is translated a movement amount based on a sensitivity of the sensor or the distance of the sensor from the control object within the scene.

Example 20 provides for the non-transitory computer-readable storage medium of any of examples 15-19, wherein the linear path is substantially perpendicular to a sensor axis of view to the control object within the scene.

OTHER IMPLEMENTATION NOTES, VARIATIONS, AND APPLICATIONS

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

In one example embodiment, any number of electrical circuits of the figures may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, example embodiments have been described with reference to particular arrangements of components. Various modifications and changes may be made to such embodiments without departing from the scope of the appended claims. The description and drawings are, accordingly, to be regarded in an illustrative rather than in a restrictive sense.

Note that with the numerous examples provided herein, interaction may be described in terms of two, three, four, or more components. However, this has been done for purposes of clarity and example only. It should be appreciated that the system can be consolidated in any suitable manner Along similar design alternatives, any of the illustrated components, modules, and elements of the figures may be combined in various possible configurations, all of which are clearly within the broad scope of this disclosure.

Note that in this Specification, references to various features (e.g., elements, structures, modules, components, steps, operations, characteristics, etc.) included in "one embodiment," "example embodiment," "an embodiment," "another embodiment," "some embodiments," "various embodiments," "other embodiments," "alternative embodiment," and the like are intended to mean that any such features are included in one or more embodiments of the present disclosure, but may or may not necessarily be combined in the same embodiments.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. Note that all optional features of the systems and methods described above may also be implemented with respect to the methods or systems described herein and specifics in the examples may be used anywhere in one or more embodiments.

What is claimed is:

1. A method comprising:
   capturing an initial sensor view of a scene with a sensor, the scene including a control object having a control point at an initial position;
   obtaining a sequence of sensor views and a sequence of relative control object positions, the sequence of sensor views beginning with the initial sensor view and the sequence of relative control object positions beginning with the initial position, the sequence obtained by iteratively:
      capturing an additional view by the sensor of a modified scene in which the control object or the sensor is translated along a linear path within the scene; and
      receiving a measured position of the translated control object along the linear path relative to the initial position;
   determining a sequence of control point locations with a control point detection algorithm applied to the sequence of sensor views;
   determining a quality score for the control point detection algorithm based on a linear correlation of the sequence of control object positions with respect to the sequence of control point locations;
   determining, based on the quality score for the control point detection algorithm, a calibration factor for the control point detection algorithm; and
   configuring an autonomous vehicle with the calibration factor and the control point detection algorithm, wherein the autonomous vehicle is configured to adjust, based on the calibration factor, control point locations determined by the control point detection algorithm executing on the autonomous vehicle.

2. The method of claim 1, further comprising:
   determining a second quality score for another set of detection conditions; and
   selecting a set of detection conditions for calibration of the sensor based on the quality score and the second quality score.

3. The method of claim 1, wherein the other set of detection conditions comprises one or more of a different control point detection algorithm, different sensor capture characteristics, a different control object, or different scene characteristics.

4. The method of claim 1, further comprising:
   determining an effective range of one or more of scene characteristics, control object characteristics, or sensor capture characteristics based on the determined quality score.

5. The method of claim 1, wherein the control object or the sensor is translated a movement amount based on a sensitivity of the sensor or a distance of the sensor from the control object within the scene.

6. The method of claim 1, wherein the linear path is substantially perpendicular to a sensor axis of view to the control object within the scene.

7. The method of claim 1, wherein the sensor comprises one or more of is an image sensor, a LIDAR, or a RADAR.

8. A system comprising:
   a processor; and
   a non-transitory computer-readable storage medium storing instructions that, when executed by the processor, causes the processor to:
      capture an initial sensor view of a scene with a sensor, the scene including a control object having a control point at an initial position;
      obtain a sequence of sensor views and a sequence of relative control object positions, the sequence of sensor views beginning with the initial sensor view and the sequence of relative control object positions beginning with the initial position, the sequence obtained by iteratively:
         capturing an additional view by the sensor of a modified scene in which the control object or the sensor is translated along a linear path within the scene; and
         receiving a measured position of the translated control object along the linear path relative to the initial position;
      determine a sequence of control point locations with a control point detection algorithm applied to the sequence of sensor views;
      determine a quality score for the control point detection algorithm based on a linear correlation of the sequence of control object positions with respect to the sequence of control point locations;
      determine, based on the quality score for the control point detection algorithm, a calibration factor for the control point detection algorithm; and
      configure an autonomous vehicle with the calibration factor and the control point detection algorithm, wherein the autonomous vehicle is configured to adjust, based on the calibration factor, control point locations determined by the control point detection algorithm executing on the autonomous vehicle.

9. The system of claim 8, wherein the instructions also cause the processor to:
   determine a second quality score determined for another set of detection conditions; and
   select a set of detection conditions for calibration of the sensor based on the quality score and the second quality score.

10. The system of claim 8, wherein the other set of detection conditions comprises one or more of a different control point detection algorithm, different sensor capture characteristics, a different control object, or different scene characteristics.

11. The system of claim 8, wherein the instructions also cause the processor to determine an effective range of one or more of scene characteristics, control object characteristics, or sensor capture characteristics based on the determined quality score.

12. The system of claim 8, wherein the control object or the sensor is translated a movement amount based on a sensitivity of the sensor or a distance of the sensor from the control object within the scene.

13. The system of claim 8, wherein the linear path is substantially perpendicular to a sensor axis of view to the control object within the scene.

14. The system of claim 8, wherein the sensor comprises one or more of an image sensor, a LIDAR, or a RADAR.

15. A non-transitory computer-readable storage medium storing instructions that, when executed by a processor, cause the processor to:
   capture an initial sensor view of a scene with a sensor, the scene including a control object having a control point at an initial position;
   obtain a sequence of sensor views and a sequence of relative control object positions, the sequence of sensor views beginning with the initial sensor view and the sequence of relative control object positions beginning with the initial position, the sequence obtained by iteratively:
      capturing an additional view by the sensor of a modified scene in which the control object or the sensor is translated along a linear path within the scene; and
      receiving a measured position of the translated control object along the linear path relative to the initial position;
   determine a sequence of control point locations with a control point detection algorithm applied to the sequence of sensor views;
   determine a quality score for the control point detection algorithm based on a linear correlation of the sequence of control object positions with respect to the sequence of control point locations;
   determine, based on the quality score for the control point detection algorithm, a calibration factor for the control point detection algorithm; and
   configure an autonomous vehicle with the calibration factor and the control point detection algorithm, wherein the autonomous vehicle is configured to adjust, based on the calibration factor, control point locations determined by the control point detection algorithm executing on the autonomous vehicle.

16. The non-transitory computer-readable storage medium of claim 15, wherein the instructions also cause the processor to:
   determine a second quality score determined for another set of detection conditions; and
   select a set of detection conditions for calibration of the sensor based on the quality score and the second quality score.

17. The non-transitory computer-readable storage medium of claim 15, wherein the other set of detection conditions comprises one or more of a different control point detection algorithm, different sensor capture characteristics, a different control object, or different scene characteristics.

18. The non-transitory computer-readable storage medium of claim 15, wherein the instructions also cause the processor to:
   determine an effective range of one or more of scene characteristics, control object characteristics, or sensor capture characteristics based on the determined quality score.

19. The non-transitory computer-readable storage medium of claim 15, wherein the control object or sensor is translated a movement amount based on a sensitivity of the sensor or a distance of the sensor from the control object within the scene.

20. The non-transitory computer-readable storage medium of claim 15, wherein the linear path is substantially perpendicular to a sensor axis of view to the control object within the scene.

* * * * *